Oct. 19, 1965  D. W. HAMM  3,212,785
OIL RING
Filed Jan. 13, 1964  3 Sheets-Sheet 1
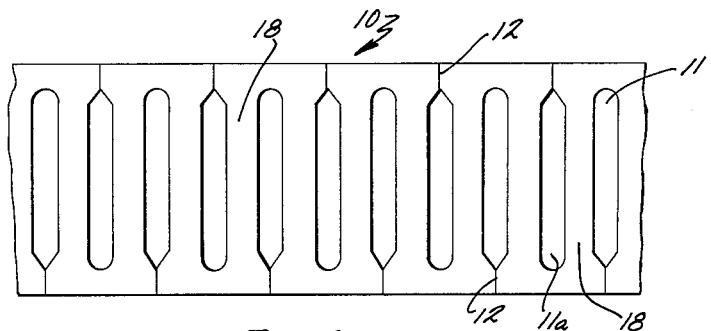
FIG. 1.
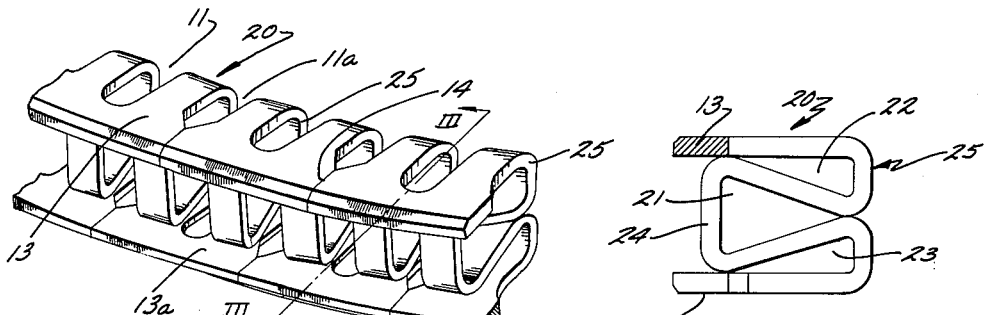
FIG. 2.   FIG. 3.
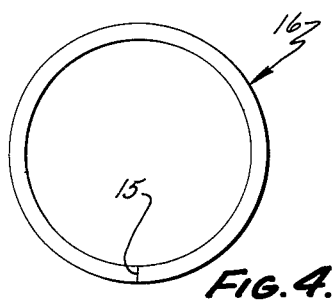
FIG. 4.
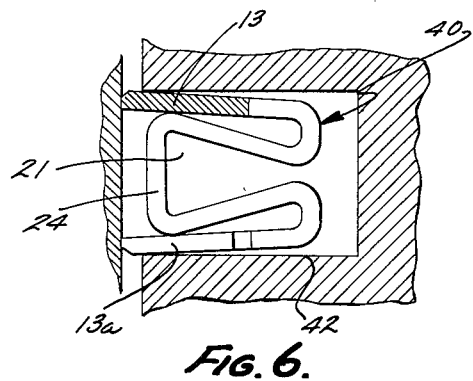
FIG. 6.
FIG. 5.
INVENTOR.
DOUGLAS W. HAMM
BY Price & Heneveld
ATTORNEYS Oct. 19, 1965  D. W. HAMM  3,212,785
OIL RING
Filed Jan. 13, 1964  3 Sheets-Sheet 2
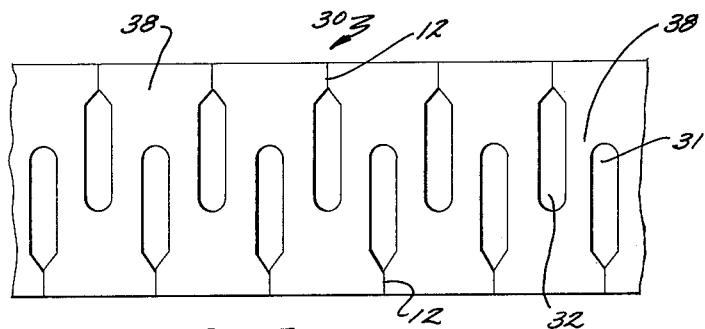
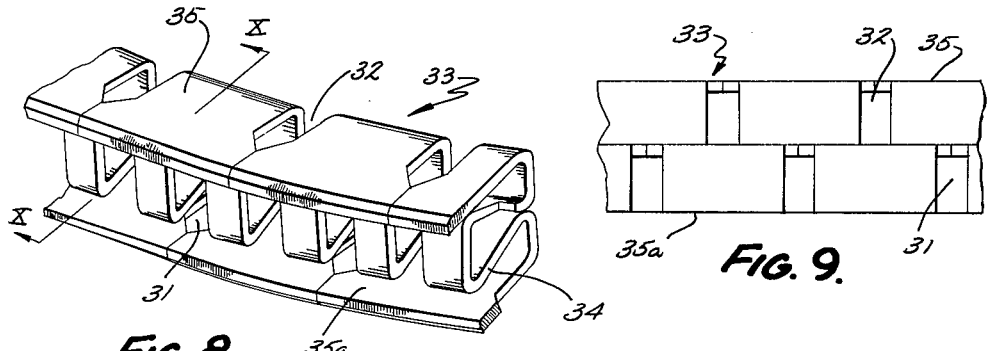
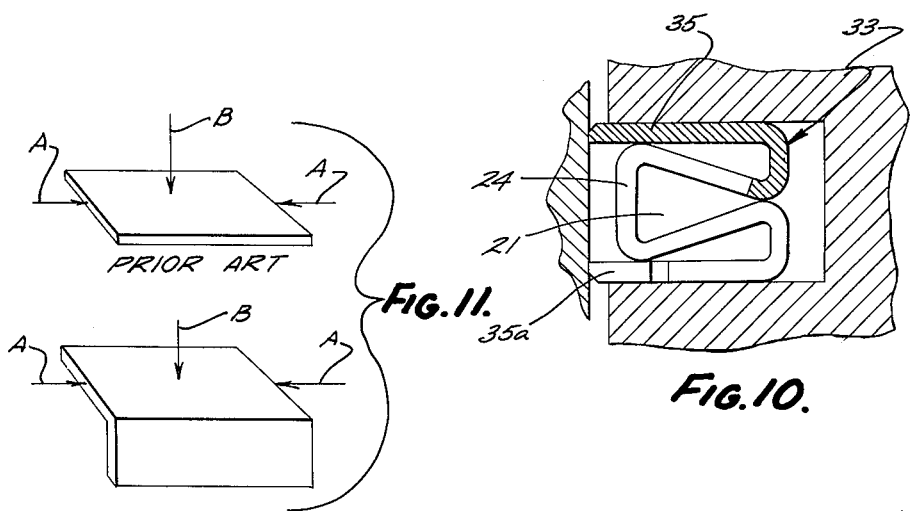
INVENTOR.
DOUGLAS W. HAMM
BY Price & Heneveld
ATTORNEYS Oct. 19, 1965     D. W. HAMM     3,212,785

OIL RING

Filed Jan. 13, 1964     3 Sheets-Sheet 3

INVENTOR.
DOUGLAS W. HAMM
BY
ATTORNEYS

United States Patent Office 3,212,785
Patented Oct. 19, 1965

3,212,785
OIL RING
Douglas W. Hamm, Muskegon, Mich., assignor to Muskegon Piston Ring Company, Muskegon, Mich., a corporation of Michigan
Filed Jan. 13, 1964, Ser. No. 337,438
5 Claims. (Cl. 277—200)

This invention relates to piston rings and more particularly to a one-piece oil ring of unique construction.

The increasing emphasis upon efficiency of oil control, coupled with the increasing demand placed upon piston rings by high efficiency, high vacuum and high compression engines is requiring the development of entirely new ring concepts. More exacting performance requirements have been placed upon rings by the demand that smog reducing components of exhaust gases be eliminated or at least sharply reduced. In addition, because of the short stroke and the exacting oil control demands placed upon oil rings by new engines, it is necessary to provide rings of greater flexibility than have been considered necessary in the past. This characteristic of flexibility is required to permit the rings to conform very closely to the cylinder wall so that the film of oil on the cylinder wall will be efficiently and positively removed during each stroke. To accomplish this greater flexibility or conformability, it is desirable to fabricate the ring from thinner material and to make the radial depth of the ring greater to increase its spring length. Such changes of course tend to weaken a ring's resistance to axial compression or collapse.

This invention overcomes the problem of weakening the ring, while improving its "soft spring" characteristics. This invention provides a unique cross-sectional construction for the ring, which not only overcomes the weakening effect of the reduction in material thickness and the increase in spring length, but makes the resulting ring even more resistant to compressive loads than rings of conventional design and material. The problem in these rings is to brace effectively the segments or scraping edges against deflection incident to the drag of the ring along the cylinder wall as it reciprocates, the collapsing or compressive loads applied to the ring by inertia and momentum at each end of the stroke, and the compressive forces of gases which attempt to escape pist the ring. It is essential that this compressive effect upon the ring be controlled. If it is not, at each end of the stroke, the sides of the ring will tend to lift from the sides of the ring groove creating a passageway through which oil is pumped in one direction and gases are pumped in the other direction. Literally, it creates a by-pass for the ring seal. This invention positively braces the sides of the ring adjacent their outer radial edge. This affords positive control against collapse or compression of the ring.

Another facet of this invention is the bracing of the individual segments themselves by reshaping them so that they have beam strength, rather than the strength of a flat plate. For this purpose, a part of each of the segments is turned under to form an angle which greatly increases their rigidity against deflection arising from the circumferential compression of the ring at the time of installation. This contributes materially to the effectiveness of both the side seal and the cylinder wall of the ring.

The invention also has another advantage in that the positive bracing of the segments eliminates the danger of damage to the ring at the time of installation. It prevents distotrion due to improper or difficult installation. The invention makes possible a positively braced ring having efficient side sealing such as where the ring is slightly collapsed axially at the time of original installation in the ring groove.

These and other objects and purposes of this invention will be understood by those acquainted with the design and use of piston rings upon study of the accompanying drawings and reading of the following specification.

In the drawings:

FIG. 1 is a fragmentary plan view of a blank from which one form of this ring is manufactured.

FIG. 2 is a fragmentary oblique view of a completed ring fabricated according to this invention.

FIG. 3 is a sectional elevation view taken along the plane III—III of FIG. 2.

FIG. 4 is a schematic view of a completed ring embodying this invention.

FIG. 5 is a sectional elevation view similar to FIG. 3 but showing a modified ring having increased side sealing effect.

FIG. 6 is a sectional elevation view of the ring illustrated in FIG. 5 installed in a ring groove.

FIG. 7 is a fragmentary plan view of a modified blank for a ring embodying this invention.

FIG. 8 is a fragmentary oblique view of a ring fabricated from the blank illustrated in FIG. 7.

FIG. 9 is a fragmentary elevation view of the inner radial face of the ring illustrated in FIG. 8.

FIG. 10 is a sectional elevation view taken along the plane X—X of FIG. 8 showing the ring installed in a ring groove.

FIG. 11 is a schematic view illustrating the principle of operation of the ring construction of FIGS. 7 through 10.

Figure 12:
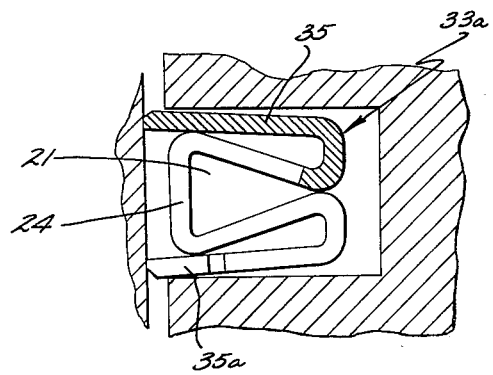
FIG. 12 illustrates a modified construction for the ring of FIGS. 7 through 10.

To execute the objects and purposes of this invention, a ring is fabricated from a continuous ribbon of material, which ring in cross section is folded back upon itself to form an enlarged loop. The outer edge of this loop lies adjacent the outer radial face of the ring, and serves as a pillar or post extending from the segments on one axial side of the ring to the segments on the other axial side of the ring bracing them against compressive loads and inward deflection. In addition to this, one form of the ring has segments, the inner radial portion of which is wrapped down the inner bight portion of the ring to form what, in effect, is an L-shaped angle resisting deflection due to circumferential compression of the ring.

Referring specifically to the drawings, and particularly to FIG. 1, the numeral 10 indicates a blank which is characterized by being a long thin ribbon of material having at equally spaced intervals, laterally elongated openings 11 and 11a. These are arranged along the blank's centerline. Each of the openings 11 and 11a is rounded on one end and pointed on the other. The pointed ends of alternate slots are in opposite directions, and thus the slots 11 differ from the slots 11a. Extending from the pointed end of each of the slots either to or close to the marginal edges of the blank are shallow score lines 12. These may be provided on one or both surfaces of the blank. The openings 11 and 11a are separated from each other by elongated straps 18.

The blank, after perforating and scoring as illustrated in FIG. 1, is roll-formed to its desired cross-sectional shape, heated and quenched to make it brittle. The score marks 12 are then cracked to separate the outer radial edges of the ring into a plurality of segments 13, divided from each other by separations 14. The segments on one axial side of the ring are identified by the numeral 13 and on the other side of the ring by the numeral 13a (FIG. 2). The ring is then re-heat treated to the proper hardness, stretched and drawn and cut-off to length to form a structure which, when the part 15 (FIG. 4) is closed, assumes the circular shape of the ring 16. The procedure which has just been outlined as the technique for manufacturing this ring is disclosed in U.S. Patent 2,668,131. It will be recognized that other methods of forming the ring may be employed in connection with this invention since this invention is directed to the shape of the ring, rather than to the method by which it is fabricated.

In forming the ring 20 illustrated in FIG. 2, the blank 10 of FIG. 1 is first folded over to form a portion extending down the inner radial bight portion of the ring. The material is then, in effect, folded upon itself to form a radially, outwardly extending loop 21 of substantial size. The remainder of the material is then folded to extend axially to form the remainder of the inner radial bight portion and then to extend radially, outwardly to form the lower side of the ring. Where the sides of the ring are folded to join the loop 21, a pair of smaller loops 22 and 23 are created. These lie adjacent the inner radial bight portion of the ring.

Figure 13:
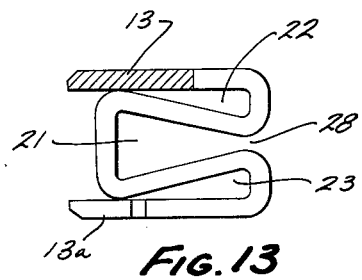
FIG. 13 illustrates a further modification applicable to both the rings of FIGS. 1 through 6 and those of FIGS. 7 through 10.

The loops 22 and 23 may be of such size that they occupy the entire inner bight portion of the ring as suggested in FIG. 3, or may be smaller, forming a gap 28 by which the outer radial loop 21 opens through the inner face of the ring as suggested in FIG. 13. Irrespective of the construction used, the axial height of the outer loop 21 is such that adjacent the outer radial portion of the ring, the sides of the loop either contact the inside surfaces of the segments 13 and 13a, or they approach closely enough that the gap between the loop and the segments does not exceed 0.005 of an inch. The radially outer wall 24 defining the end of the loop 21 is, for all practical purposes, a straight pillar or post extending axially between the segments 13 and 13a. As such, it forms a rigid pillar or post supporting these segments at a point very close to their free ends. It provides a positive limitation upon the freedom of movement of the segments toward each other. Whether or not the loop 21 is closed or open at the inner radial bight portion as is contrasted by the illustrations in FIGS. 3 and 13 does not in any way influence the supporting pillar effect of the wall 24. It is this pillar wall which in part provides this ring with great resistance to compressive loads. Thus, there is disclosed a one-piece piston ring having a body with integral upper and lower segmented side members with a portion of the body folded to form an axial brace or pillar for the segments adjacent their point of contact with the cylinder wall. Every segment is so braced.

It will be obvious that the wall 24 serves as a support at the point of maximum compressive loading of the ring. It is immediately adjacent the point of contact between the ring and the cylinder wall. Thus, it affords positive and close support for the scraping faces of the ring where they are subjected to the drag of their sliding movement along the cylinder wall. Also, this support is immediately adjacent the land or clearance between the piston and the cylinder walls, where whatever compressive loads are created by escaping combustion gases impose their maximum compression force upon the ring. It also supports these segments against the point of maximum bending effect imposed by the inertial and momentum resulting from the piston's reciprocation. It also eliminates the multiplication of bending forces arising out of the fact that, in the absence of the pillar, the segments are secured only at the extreme inner radial portion of the ring. Without the pillar 24, the loads are applied at the very end of this long arm where the moment incident to these loads is greatest.

It will be noted from FIG. 2 that each of the segments 13 and 13a is joined to a pair of struts 25. These struts are formed by the straps 18 which remain between the openings 11 and 11a in the blank. Since the segments 13 are offset circumferentially from the segments 13a, each of the struts 25 integral with one of the segments 13 is integral with a different one of the segments 13a. It is these struts which are formed into the compound curvature which creates the loops 21, 22 and 23, together with the supporting pillar 24. To provide sufficient length of material to create these loops, the struts 25 are of substantial length.

The struts serve as springs giving the ring flexibility, and by reason of their length, the flexibility of the ring is greatly increased since the spring itself is significantly longer than rings of prior known constructions. This characteristic is known as "soft spring." Because it permits an increase in radial deflection of the ring for a given radial tension value, the ring has increased freedom to conform to the cylinder walls, and thus, to effect a tight and effective seal. This softening of the spring characteristic of the ring does not weaken the ring because of the existence of the pillars 24 providing positive axial support for the segments.

FIGS. 7 through 10 illustrate a modification of this invention. In this case, the blank 30 also is of a thin ribbon-like material. It also has equally spaced, laterally elongated slot-like openings 31 and 32 separated from each other by elongated straps 38. The openings 31 and 32 are similar to the openings 11 and 11a. Like the openings 11 and 11a, the openings 31 and 32 each have a rounded end and a wedge or pointed end, with the pointed ends of the slots 31 directed oppositely to the pointed ends of the slots 32. The slots 31 and 32 are arranged alternately along the blank. Unlike the openings 11 and 11a, the openings 31 and 32 are offset from each other, transversely of the blank. Thus, the openings 31 are all closer to one edge margin of the blank, while the slots 32 are all closer to the opposite edge margin of the blank. Thus, they form something which might be considered a zig-zag pattern, and are not centered along the centerline of the blank.

To form the blank 30 into a circular ring of the type illustrated in FIG. 4, the same procedure and folding operations are performed as are utilized to form the ring 20 illustrated in FIG. 2. The resulting ring 33 is illustrated in FIG. 8. Its cross-sectional configuration, so far as the path traced by the struts 34 is concerned, is identical to that of the ring 20. However, the offsetting of the openings 31 and 32 materially changes the nature of the segments 35 and 35a. Instead of the segments terminating the sides of the ring, their inner radial portions extend down the inner bight portion of the ring and into the inner portion of the sides of the main loop 21 (FIG. 10). Thus, each of the segments is no longer simply a flat strip of material, but is, for all practical purposes, an L-shaped angle. Thus, each is substantially reinforced.

FIG. 11 illustrates the change in principle which is introduced by this change in structure. The prior art illustration of FIG. 11 shows segments of conventional design, that is a flat piece of material to which compressive loads A are applied endwise and bending loads B are applied against the broad surface. The compressive loads are created by the circumferential compression of the ring when it is closed and placed within the cylinder. These loads must be applied in order to create the radial tension necessary to make the ring function properly. These compressive loads tend to buckle the flat plate-like structure which is characteristic of the prior art. If they are not sufficient to create buckling, they do cooperate with the bending loads applied normal to the broad surfaces to increase the tendency to buckle and deflect when these bending loads are applied. These are the loads applied by the scraping of the ring against the cylinder walls and the compressive forces of the gases to which the ring is exposed, as well as the collapsing effect of momentum and inertial forces applied adjacent each end of the stroke.

The lower portion of FIG. 11 illustrates what this invention has done to the segments. It will be seen that each segment now has along one edge, a skirt or flange at right angles to the flat plate-like portion. This angle stiffens the entire segment. It materially increases the segment's ability to resist the circumferential compressive forces A. It also increases the segment's ability to resist the axially applied bending loads B. At the same time, the flexibility of the ring is not materially affected because the cross-sectional configuration of the ring maintains a spring of such length that despite the rigidity of the segment itself, the ring as a whole is highly flexible, and therefore, highly conformable for a predetermined radial tension value. Because this particular ring construction has such a marked degree of "soft spring" effect, it is possible to increase the length of the segment. Thus, every other or every third one of the score lines 12 may be ruptured rather than rupturing every one. This materially reduces the number of parts or separations around the circumference of the ring, and of course, thereby reduces the number of openings through which it is possible for lubricants or gases to escape past the seal effected by the ring.

FIGS. 5, 6 and 12 illustrate the fact that either of the rings 33a or 40 may be constructed with increased side sealing effect. These rings, when initially formed into their cross-sectional shape, have slightly divergent sides, giving the ring a slight wedge shape. As the ring is placed in the ring groove as suggested in FIG. 6, the sements and thus the whole sides of the ring are compressed slightly. This assures a positive side sealing contact with the outer edges of the ring groove without interfering with the freedom of the ring to shift radially as it conforms to the shape of the cylinder walls. It will be noted from FIG. 5 that a small amount of gap 41 is provided between the ends of the pillar 24 and the inside surfaces of the segments 13 and 13a. This gap is either closed or preferably almost closed when the ring is seated in the ring groove 42 (FIG. 6). This gap at the closure should be approximately 0.001 of an inch.

FIG. 12 illustrates the same principle of diverging ring sides as is illustrated in FIGS. 5 and 6 but applied to a ring of the type illustrated in FIG. 8. Thus, the ring 33a has both side sealing effect because of the postive seating against the outer edge of the ring groove, and the beam effect of the deeper segments 35 and 35a. It also retains the rigid support effect of the pillar 24.

In some instances, it may be desirable to install rings of the type illustrtaed in FIGS. 5, 6 and 12 without any actual compression of the sides. Even under these circumstances, the divergence of the sides effects significant improvement in side sealing effect because the inclination further strengthens the segments against axial flexing.

Figure 14:
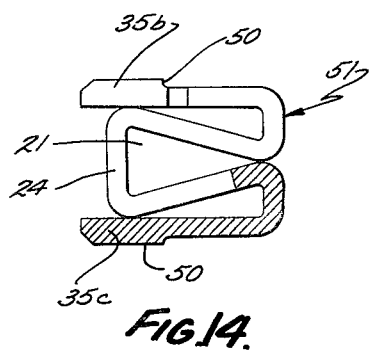
FIG. 14 is a sectional elevation view illustrating a further modification applicable to both the rings of FIGS. 1 through 6 and those of FIGS. 7 through 10.

FIG. 14 illustrates the fact that the segments can be further reinforced by the provision of a ridge or reinforcing rib 50 near the outer edges. Thus, the ring 51 has even stiffer segments so far as resistance to compressive forces are concerned than the other rings without effecting the spring effect. It will be recognized that the use of the reinforcing ribs on the segments 35b and 35c could be applied to all the ring structures which have been previously described.

This invention involves the new concept of a one-piece integral ring having the cylinder wall engaging side portions divided in many independent segments with each of the segments axially braced. The invention also, for the first time, discloses a structure by which this can be done in a one-piece ring. It is the first time axial bracing has been used to control segment flutter in a one-piece ring.

This invention provides a substantial advance in oil rings. It provides a ring having positive control of the axial spacing of the segments. It, thus, materially improves the side sealing effect of the ring. Without loss of strength, it makes the ring more flexible or resilient because of the increased length of the spring. This is accomplished without impairment of the ring strength or radial tension characteristics. It provides a ring with increased resistance to deflection and buckling of the segments. Since the segments are positively supported against axial compression of the ring, and are reinforced against buckling under circumferential compression, a thinner material may be used for the ring itself. This decreases cost, and decreases the weight of the ring. The decreases in weight reduce the magnitude of the inertial and momentum forces to which the ring is subjected during operation. This, in turn, reduces the deflection effects applied to the ring due to these forces.

Preferred embodiments of this invention, together with the modifications thereof, have been illustrated and described. It will be recognized that the illustrated and described embodiments are not exhaustive of the embodiments which may be made, applying the principles of this invention. Such of these modifications as incorporate the principles of this invention are to be considered as included in the hereinafter appended claims, unless these claims by their language expressly state otherwise.

I claim:

1. A parted piston ring having a one-piece body member; said body member having integral upper and lower side portions forming cylinder wall engaging members, said side portions being joined by a central loop portion; said side portions being divergent in a radially outward direction; the radially outer ends of each of said side portions being divided circumferentially into a plurality of segments structurally severed from adjacent segments by lines of separation; said central loop portion forming a plurality of straight pillars extending axially between segments, the ends of said pillars being positioned to contact said segments adjacent the outer radial ends of said segments for supporting said segments against converging axial movement; at least one of said pillars being provided for each of said segments; the ends of said pillars and the axially inner surfaces of said segments being spaced when said ring is in free state, the length of said pillars being such that said segments may be axially bent to parallel position before contacting the ends of said pillars.

2. A parted piston ring as described in claim 1 wherein said central loop portion has sides which occupy a major axial portion of the inner face of the ring and at said inner face are axially spaced apart.

3. A piston ring as described in claim 1 wherein said central portion is divided into a plurality of parallel strut members circumferentially separated from each other by slots extending from the segments on one side of said ring to the segments on the other side thereof; the ends of alternate ones of said slots being offset toward the segments of one of said side portions, the ends of the remaining ones of said slots being offset toward the segments of the other of said side portions and portions of each of said segments extending axially to form the inner radial portion of said ring and imparting to said segments the structural beam characteristics of an L-shaped angle member.

4. In combination, a piston and a parted piston ring, said piston having a ring groove of an axial width equal to the compressed axial width of said piston ring, said piston ring having a one-piece body member; said body member having integral upper and lower side portions forming cylinder wall engaging members, said side portions being joined by a central loop portion; said side portions being divergent in a radially outward direction, the outer surfaces of the outer portions thereof being spaced apart a distance greater than the axial width of said groove when said ring is in free state; the radially outer ends of each of said side portions being divided circumferentially into a plurality of segments structurally severed from adjacent segments by lines of separation; said central loop portion forming a plurality of straight pillars extending axially between segments, the ends of said pillars being positioned to contact said segments adjacent the outer radial ends of said segments for supporting said segments against converging axial movement; at least one of said pillars being provided for each of said segments; the ends of said pillars and the axially inner surfaces of said segments being spaced when said ring is in free state, the spacing between the ends of said pillars and the axially inner surfaces of said segments being closed and said segments being generally parallel when said ring is fully seated in said groove.

5. A piston ring having a body formed from a single piece of material, said body having a pair of axially spaced side members forming the outer radial edge of said ring; each of said side members being divided into a plurality of individual segments, the remainder of the body of said ring being divided into a plurality of separate and circumferentially spaced strut members, said strut members connecting the segments of one of said side members to the segments of the other of said side members; each of said segments being supported by at least a pair of said strut members, each of said strut members between said side members being formed into a loop of somewhat triangular shape, each of said loops having its apex adjacent the inner radial edge of said ring substantially midway between said sides and the base of said triangle adjacent the outer radial edge of said ring, the sides of said loop at said apex being axially spaced imparting to said ring resilient axial compressibility at its inner radial side, said base portion of said triangular loops extending between said side members and forming straight pillars extending axially between and supporting said segments; the ends of said pillars being positioned to contact said segments adjacent the outer radial ends of said segments; said strut members being separated by slots extending from the segments on one side of said ring to the segments on the other side thereof; the ends of alternate ones of said slots being offset toward the segments on one of said side members, the ends of the remaining ones of said slots being offset toward the segments on the other of said side members and portions of each of said segments extending axially to form the inner radial portion of said ring and imparting to said segments the structural beam characteristics of an L-shaped angle member.

References Cited by the Examiner
UNITED STATES PATENTS

| | | | |
|---|---|---|---|
| 2,224,338 | 12/40 | Bowers | 277—200 |
| 2,291,945 | 8/42 | Bowers | 277—200 |
| 2,474,493 | 6/49 | Phillips | 277—200 X |
| 2,569,778 | 10/51 | Phillips | 277—200 |
| 2,631,908 | 3/53 | Teetor | 277—200 |

LEWIS J. LENNY, *Primary Examiner.*

EDWARD V. BENHAM, *Examiner.*